3,058,691
VERTICAL TAKE OFF COMPOSITE AIRCRAFT
Gerhard Eggers, Dammarie-les-Lys, Raoul Henri Dumez, Montrouge, and Gunther Ernst, Dammarie-les-Lys, France, assignors to Societe Nationale d'Etude et de Construction de Moteurs d'Aviation, Paris, France, a French company
Filed Feb. 3, 1958, Ser. No. 712,716
Claims priority, application France Feb. 6, 1957
3 Claims. (Cl. 244—2)

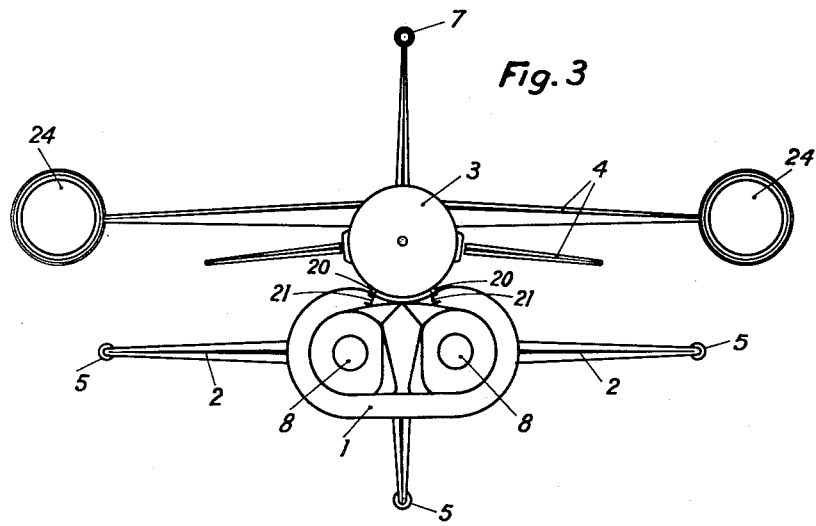
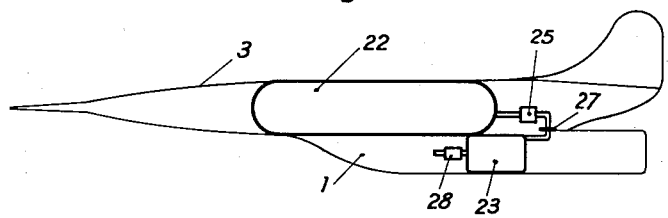
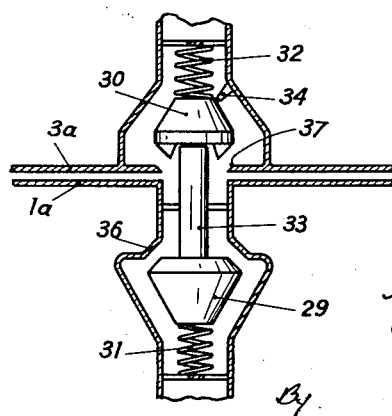

An object of the present invention is to provide a composite aircraft capable of taking off vertically and applicable for launching an aeroplane designed to propel itself and fly by its own means upon reaching a predetermined altitude and speed. Another possible application of the invention is as a flying test bench for an aeroplane or its various components.

A further object of this invention is to allow vertical take-off without the assistance of a launching stand or other ground appliances.

Another object of this invention is to facilitate the launching of aeroplanes designed to fly at high supersonic speeds and to reach long distance targets in the shortest time.

The composite aircraft of the invention is essentially composed of (1) A relatively light V.T.O.L. carrier craft—hereinafter referred to as a "pusher"—powered by one or more turbo-jets and equipped with the aerofoils required for independent flight during its return travel after launching has been performed, and (2) An aeroplane, i.e. an aerodyne deriving lift from the relative airflow and equipped with its own power plant.

In this arrangement, the pusher supplies the full thrust required by the composite aircraft for taking off, climbing and reaching the predetermined conditions for starting the power plant of the aeroplane, whereas the aerofoils of the latter contribute to lift generation during horizontal flight of the composite aircraft, supplementing the action of the aerofoils of the pusher.

Other features of the invention will appear from the following description given with reference to the accompanying drawings in which:

FIGURE 3 is an end view of this aircraft, as seen in the direction of the arrow F of FIGURE 2.

FIGURE 5 is a side elevation of this pusher.

FIGURE 6 is a diagrammatic view of the fuel supply system for the jet engines of the pusher.

FIGURE 7 shows on a larger scale a detail of an automatic self-obturating union.

Figure 1:
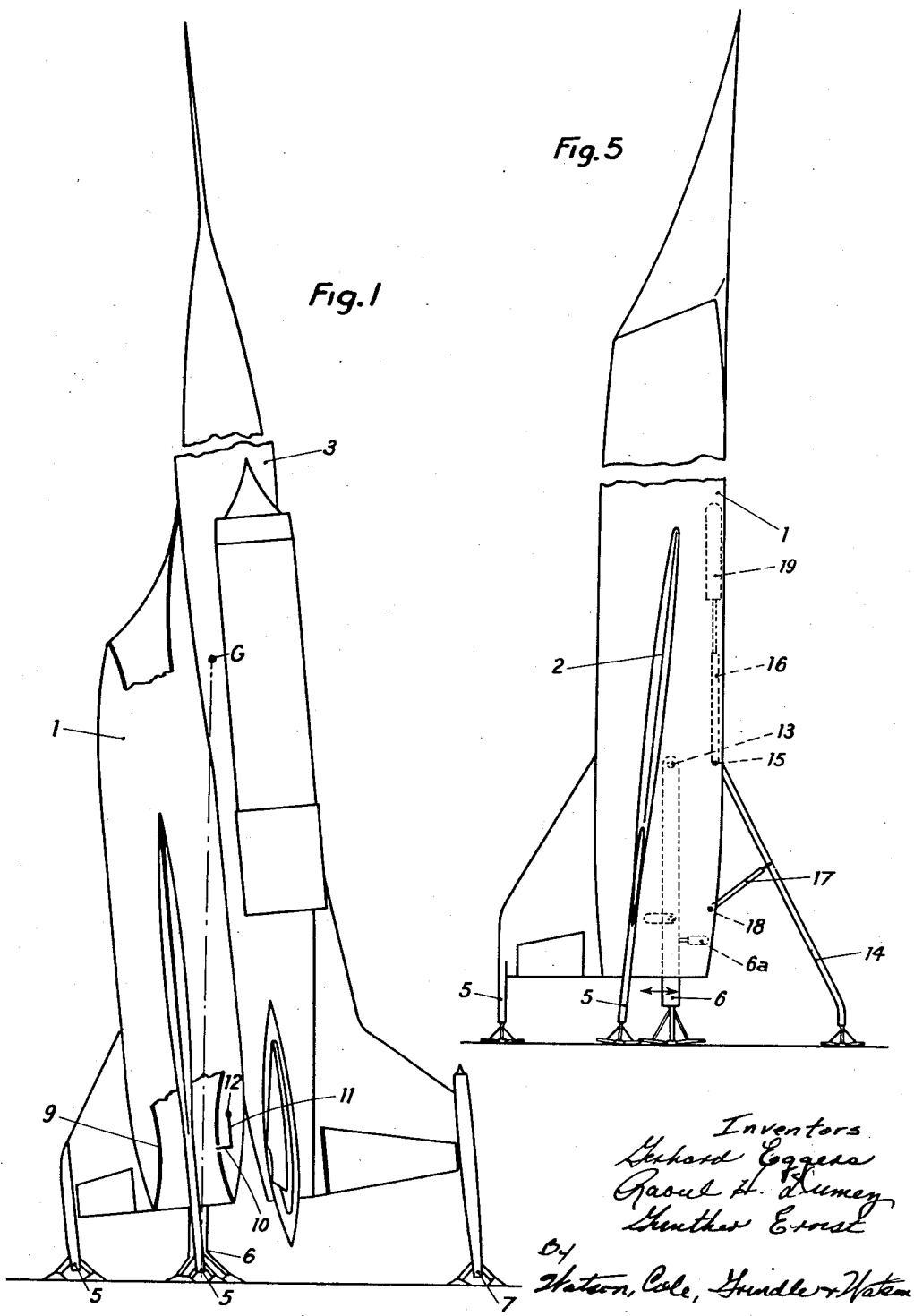
FIGURE 1 is a side elevation of one embodiment of a composite aircraft, ready for vertical take-off.
Figure 2:
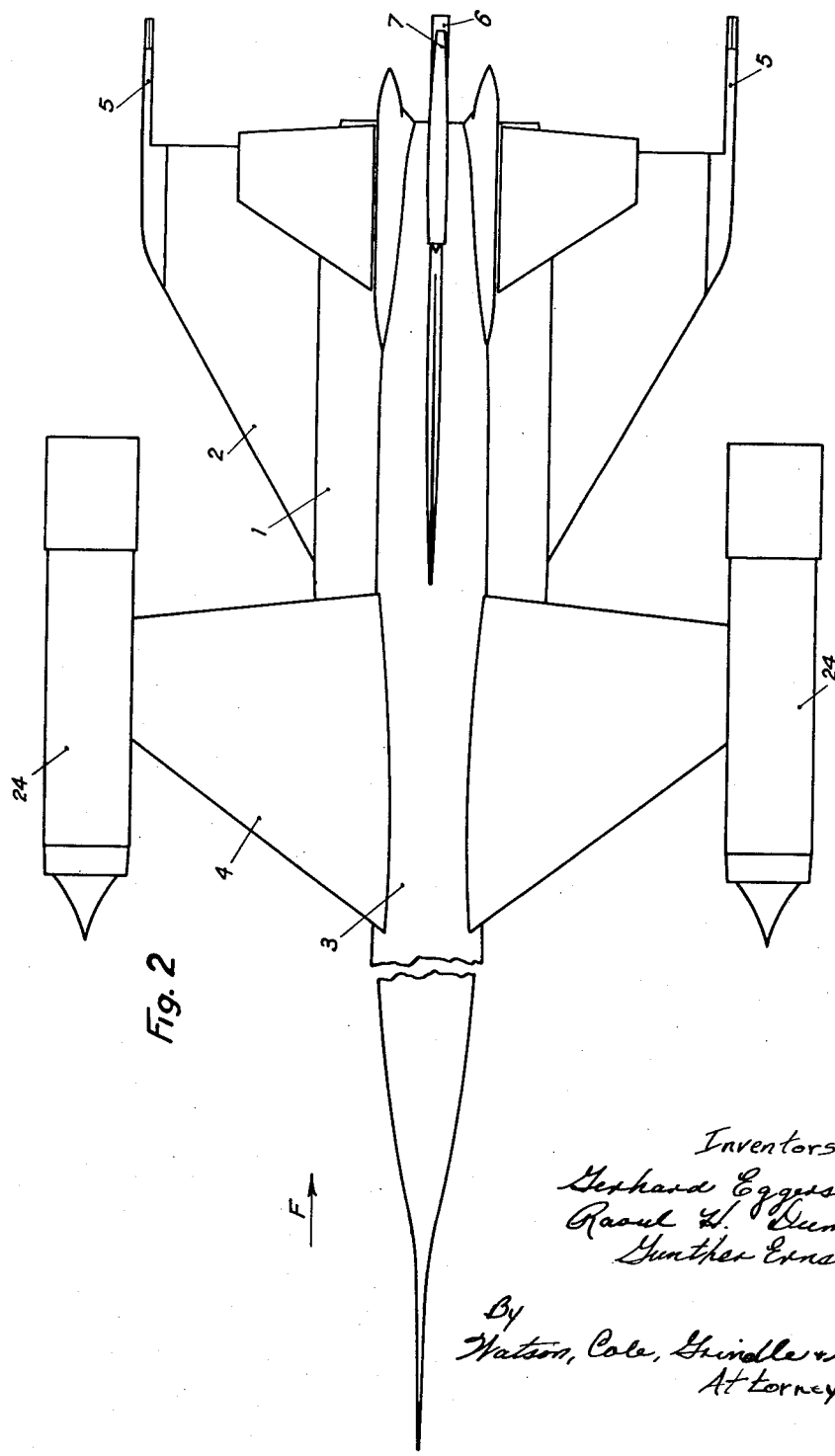
FIGURE 2 is a plan view of the composite aircraft during horizontal flight.
Figure 4:
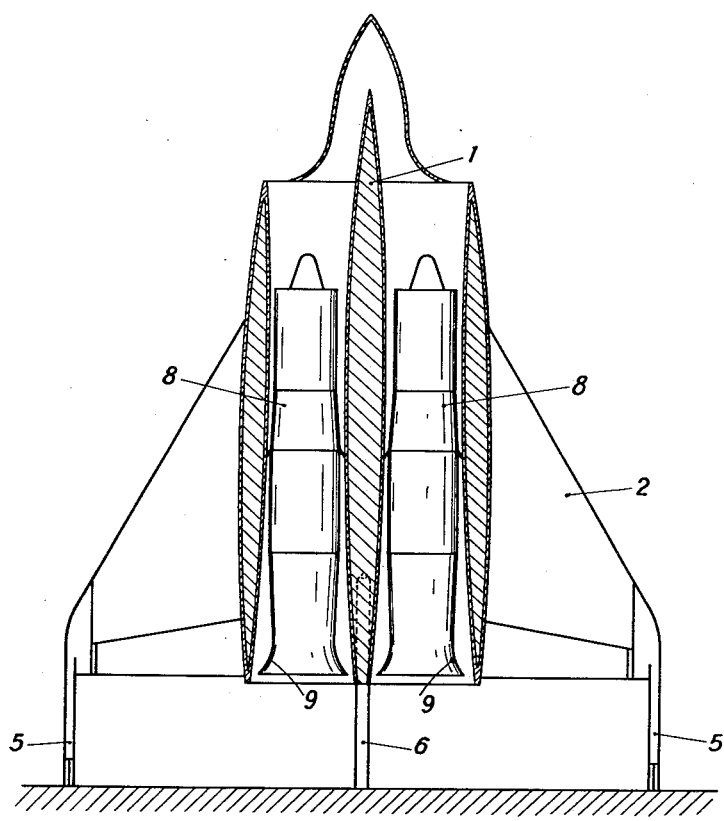
FIGURE 4 is an elevation in section of the pusher alone, resting on the ground, in a vertical attitude.

The composite aircraft illustrated in FIGURES 1 to 3 comprises its two main components, connected to one another for taking off and gathering speed. The component bearing reference numeral 1 is a pusher provided with one or more turbo jet engines 8 and is designed for vertical take-off and landing. It is moreover provided with an aerofoil 2 supplying the required lift in horizontal flight. The drawings show a delta aerofoil but this aerofoil may alternatively be straight, swept-back or annular.

The pusher is accordingly an independent aerodyne. Whether carrying a pilot or remote-control, it is capable of returning to its base after departure of the other component of the composite aircraft.

This second component 3 is an aeroplane, i.e. an aerodyne provided with wings 4 and relying on the relative airflow for lift generation. This aeroplane is attached to the pusher 1 by any linking means which may be readily disconnected in flight either under the pilot's action or by remote control. This aeroplane thus forms together with the pusher a composite aircraft adapted for vertical take-off, for climbing to a predetermined altitude and for gathering speed in horizontal flight, until the said aeroplane is freed from the pusher and carries on its flight by its own means. In the example of the drawings the power plant of the aeroplane consists of two ram jet engines 24 housed in nacelles at the wing tips.

Before take-off, the composite aircraft rests on the ground by means of a number of legs carried by the pusher and the aeroplane. In the illustrated embodiment, the pusher has three legs 5 positioned at the tips of its wing surfaces, as well as an articulated central leg 6, whereas the aeroplane comprises a leg 7 arranged at the tip of its empennage, the assembly of the legs of the pusher and of the aeroplane forming the corners of a large polygon about the vertical through the center of gravity G of the composite aircraft.

The turbo jet engines 8 of the pusher are designed for supplying the thrust required by the composite aircraft at take-off, and in order to reduce the power expended by the pusher, the latter is made as light as possible.

In the illustrated embodiment, two turbo-jets 8 are provided and housed in parallel nacelles.

The aeroplane 3, which comprises relatively wide wings 4 and a rather large fuel supply, is in general heavier than the pusher. The center of gravity G of the composite aircraft is therefore positioned as indicated in FIGURE 1, offset from the plane through the axes of the two turbo jet engines of the pusher. Under these circumstances, it will be convenient to correspondingly offset the thrust axis during the take-off, so that it passes through the center of gravity G. For this purpose the nozzle 9 of each turbo-jet engine may be provided with a spoiler or jet deflector device imparting to the jets the required deviation. In FIGURE 1 this spoiler is of a mechanical type, comprising an obstacle 10 carried by an arm 11 pivoted at 12. A hydraulic jack (not shown) or any other appropriate control member causes the obstacle 10 to protrude into the nozzle through a slot of the wall of the latter during take-off. This obstacle may be withdrawn after take-off of the composite aircraft in order to restore the axial direction of the jets of the turbo-jet engines when the speed has become sufficient for the aerodynamic controls to become effective. The jet deflector device may of course be of any other type, for example of the auxiliary fluid jet type.

In order furthermore that the thrust at take-off be vertical, it is convenient to provide legs 5 and 7 of different length, so that the composite aircraft be slightly inclined with respect to the vertical, as shown in FIGURE 1.

It is also convenient that the central leg 6 be on the vertical through the center of gravity G of the composite aircraft. As moreover this leg ought to be on the vertical through the center of gravity of the pusher separated alone when the latter touches down after a vertical landing operation (FIGURE 5), it is convenient to mount this central leg to the pusher by means of a hinge 13 which may be provided on the structure of the pusher, between the casings of the turbo jet engines 8, the central leg thus being located in the vertical plane of symmetry of the assembly. A hydraulic jack 6a brings this central leg 6 in one or the other of its positions corresponding to the composite aircraft or to the pusher alone.

An auxiliary leg 14, which is retracted into the structure of the pusher when the latter is combined with the aeroplane, assumes its operative protruding position illustrated in FIGURE 5 during landing of the pusher alone. This leg 14 may be hinged for example on a pivot 15 movable along a slide 16 and associated with a connecting rod 17 hinged at 18. A jack 19 acting on the pivot 15 allows retracting the leg or bringing it into the operative position.

For a good transmission of the forces between the structure of the pusher and that of the aeroplane, the two structures are connected to one another at points distributed over longitudinal lines which are as long as possible.

FIGURE 3 shows an embodiment in which two protruding struts 20 from the aeroplane are connected to the pusher by latches, not shown, engaging two corresponding struts 21 of the structure of the pusher, and capable of being simultaneously disengaged by a single control when the aeroplane is to be freed.

For the purpose of making the pusher as light as possible and also of reducing its overall cross-section as far as possible, and hence its drag, the main fuel supply is contained in one or more tanks 22 in the fuselage of the aeroplane where the available room is largest. The pusher comprises one or more small tanks 23 the volume of which is just sufficient for containing the quantity of fuel required by the pusher for returning to its base, after the departure of the aeroplane. These may be of annular shape and housed in the casings surrounding the turbo-jet engines 8.

From the tank 22, distributing members (not shown) conduct the fuel to the engines of the aeroplane. Moreover a feeder pump 25 forces the fuel through a union 27 into the tank 23 of the pusher in such a manner as to keep it full. A distribution system comprising a pump 28 supplies fuel to the combustion chambers of the jet engines of the pusher. The union 27 is designed in such a manner as to provide automatic closure on the aeroplane as well as on the pusher, when they separate. FIGURE 7 shows by way of example such a union, comprising two valves; one of them, 29, on the pusher, the skin of which is shown at 1a, the other, 30, on the aeroplane, the skin of which is shown at 3a. The valves are urged to closing position by springs 31 and 32 with different forces. The spring 31 being the stronger one, the tail 33 of the valve 29 opens the valve 30 until it meets an abutment 34, when the walls 1a, 3a are connected to one another. The fuel can thus pass from the pump 25 to the tank 23. When the pusher and the aeroplane separate, the two valves are forced by their respective spring on their seats 36, 37, respectively, thus effecting tight closure of the corresponding circuits.

What is claimed is:

1. A composite aircraft designed for vertical take-off comprising a carrier aerodyne powered by a jet propulsion power plant, an aeroplane externally and detachably secured to said aerodyne, and a plurality of legs supporting said aircraft on the ground, said legs being provided on both the carrier aerodyne and the aeroplane and projecting rearwardly therefrom.

2. Composite aircraft as claimed in claim 1, wherein the legs are arranged to support said aircraft in an attitude slightly inclined to the vertical, the inclination being such that the thrust line of the power plant of the carrier aerodyne passing through the center of gravity of said composite aircraft is substantially vertical.

3. Composite aircraft as claimed in claim 1, wherein one of the legs is located centrally of said aircraft and is pivotally mounted on the carrier aerodyne, said leg being adjustable into two positions wherein it extends substantially on the vertical through the center of gravity of said composite aircraft and of said carrier aerodyne alone, respectively.

References Cited in the file of this patent

UNITED STATES PATENTS

| | | |
|---|---|---|
| 2,364,803 | Mayhew | Dec. 12, 1944 |
| 2,421,742 | Buettner | June 10, 1947 |
| 2,686,473 | Vogel | Aug. 17, 1954 |
| 2,692,094 | Brown | Oct. 19, 1954 |
| 2,734,698 | Straayer | Feb. 14, 1956 |
| 2,763,447 | Garrau | Sept. 18, 1956 |
| 2,767,943 | Janney et al. | Oct. 23, 1956 |
| 2,821,351 | Utgoff | Jan. 28, 1958 |
| 2,859,003 | Servanty | Nov. 4, 1958 |
| 2,936,969 | Griffith et al. | May 17, 1960 |

FOREIGN PATENTS

| | | |
|---|---|---|
| 732,978 | Great Britain | July 6, 1955 |